United States Patent
Whitelaw

(10) Patent No.: US 8,041,127 B2
(45) Date of Patent: Oct. 18, 2011

(54) METHOD AND SYSTEM FOR OBSCURING AND SECURING FINANCIAL DATA IN AN ONLINE BANKING APPLICATION

(75) Inventor: James E. Whitelaw, Edmonton (CA)

(73) Assignee: Intuit Inc., Mountain View, CA (US)

( * ) Notice: Subject to any disclaimer, the term of this patent is extended or adjusted under 35 U.S.C. 154(b) by 1099 days.

(21) Appl. No.: 11/607,582

(22) Filed: Nov. 30, 2006

(65) Prior Publication Data

US 2008/0130940 A1    Jun. 5, 2008

(51) Int. Cl.
*G06K 9/00* (2006.01)

(52) U.S. Cl. .......................... 382/229; 382/100; 715/209

(58) Field of Classification Search .................. 382/100, 382/229; 715/209, 530
See application file for complete search history.

(56) References Cited

U.S. PATENT DOCUMENTS

| | | | | |
|---|---|---|---|---|
| 5,765,176 A | * | 6/1998 | Bloomberg | 715/209 |
| 5,850,480 A | * | 12/1998 | Scanlon | 382/229 |
| 5,960,080 A | * | 9/1999 | Fahlman et al. | 380/252 |
| 6,094,684 A | * | 7/2000 | Pallmann | 709/227 |
| 6,199,081 B1 | * | 3/2001 | Meyerzon et al. | 715/210 |
| 6,609,200 B2 | * | 8/2003 | Anderson et al. | 713/176 |
| 7,264,163 B2 | * | 9/2007 | Heilper et al. | 235/454 |
| 7,624,277 B1 | * | 11/2009 | Simard et al. | 713/182 |
| 2003/0120608 A1 | * | 6/2003 | Pereyra | 705/64 |
| 2003/0145017 A1 | * | 7/2003 | Patton et al. | 707/104.1 |
| 2004/0029526 A1 | * | 2/2004 | Miki et al. | 455/11.1 |
| 2005/0278627 A1 | * | 12/2005 | Malik | 715/530 |
| 2006/0242063 A1 | * | 10/2006 | Peterson et al. | 705/42 |
| 2007/0182983 A1 | * | 8/2007 | Wyatt et al. | 358/1.15 |
| 2007/0192630 A1 | * | 8/2007 | Crane et al. | 713/193 |
| 2007/0260558 A1 | * | 11/2007 | Look | 705/76 |

* cited by examiner

*Primary Examiner* — Hadi Akhavannik

(74) *Attorney, Agent, or Firm* — Park, Vaughan, Fleming & Dowler LLP; Shun Yao

(57) ABSTRACT

One embodiment of the present invention provides a system that obscures critical information communicated over a network. During operation, the system receives a set of data and produces a file which represents a character in the data with at least one image, thereby avoiding representing the data in plain text and reducing the risk of scraping. The system then communicates the file to a client, thereby allowing the client to present the data using the embedded images.

18 Claims, 7 Drawing Sheets

METHOD AND SYSTEM FOR OBSCURING AND SECURING FINANCIAL DATA IN AN ONLINE BANKING APPLICATION

BACKGROUND

Related Art

The present invention relates to secure network communications.

The ubiquity of Internet connectivity and Web browsers has made Web pages the most common user interface for Internet-enabled applications. Web-based applications now allow users to instantaneously complete transactions that used to take days or weeks to complete. For example, through Web-based applications, one can purchase merchandise, track shipments, check bank accounts, or pay credit card bills with just several mouse clicks.

However, the wide deployment of Web-based applications also creates new security concerns. In the past few years, HyperText Markup Language (HTML) Scraping has become a common practice. During HTML Scraping, a computer system (HTTP client) impersonates a human user utilizing a web browser to make HTTP requests to an HTTP server. This computer then interprets the data contained in Web pages sent from by the HTTP server and extracts valuable information from the "snapshots" of these Web pages. Furthermore, scraping is not limited only to HTML files, but has also been extended to any files used to create Web pages.

Although scraping is often used for non-malicious purposes, such as for analyzing a user's Internet behavior, unauthorized eavesdropping is nevertheless intrusive to the user's privacy. Such eavesdropping be a problem when a transaction involves critical financial data, and wherein both the financial institution and the user desire complete privacy and security. Conventional security measures which require a mere username and password are inadequate to solve this problem, because the Web pages displayed on the user's monitor are still based on the code which transports the critical data in plain text. These interactions are typically secured by Secure Socket Layer (SSL) encryption, which can make unauthorized eavesdropping more difficult, but does not solve the problem of an unauthorized agent or system utilizing the user's login credentials, whether acquired legitimately or not, and impersonating the user to initiate an online banking session for the purpose of scraping data for unauthorized purposes.

SUMMARY

One embodiment of the present invention provides a system that obscures critical information communicated over a network. During operation, the system receives a set of data and produces a file which represents a character in the data with at least one image, thereby avoiding representing the data in plain text and reducing the risk of scraping. The system then communicates the file to a client, thereby allowing the client to present the data using the embedded images.

In a variation of this embodiment, producing the file involves replacing the character with an image. A character can be an alphabetic character, a numeric character, or a symbol.

In a variation of this embodiment, producing the file involves dividing the character into a number of portions and replacing each portion with an image. A character can be an alphabetic character, a numeric character, or a symbol.

In a variation of this embodiment, the system dynamically generates the images used for each session, thereby preventing an unauthorized scraper from acquiring a mapping between one or more images and a character through Optical Character Recognition (OCR).

In a variation of this embodiment, the system dynamically, that is, non-deterministically, generates the universal resource identifiers (URI's) used to reference the images, thereby preventing an unauthorized scraper from acquiring a mapping between an image and the URI used to reference the image.

In a variation of this embodiment, the system dynamically generates the images for each character represented by image, thereby preventing an unauthorized scraper from acquiring a mapping between one or more images and a character through OCR.

In a variation of this embodiment, the system steganographically conceals the file within one or more cover images, thereby further reducing the risk of scraping. Additionally, communicating the file to the client involves communicating the cover images to the client, thereby allowing the client to extract the concealed file.

In a further variation, the system encrypts the file prior to steganographically concealing the file.

One embodiment of the present invention provides a system for securing critical information communicated over a network. During operation, the system receives one or more steganographically encoded cover images. The system then extracts the concealed data from the cover images based on a set of pre-determined rules and presents the data to a user.

In a variation of this embodiment, extracting the concealed data from the cover images involves extracting a file which represents a character in the concealed data with at least one image. Furthermore, presenting the data to the user involves displaying the images which represent the characters in an arrangement that accurately presents the data.

In a variation of this embodiment, the system decrypts the extracted file prior to presenting the data.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Embodiments of the present invention provide a mechanism for displaying critical data to a user without directly displaying the data in plain text within a file that contains a Web page. Such a file can be based on any language which is suitable for creating Web pages. In this description, the terminology "browser-interpretable file" refers to any file based on one or more languages which can be interpreted by a Web browser. Such languages include, but are not limited to: markup languages such as HTML, Extensible Markup Language (XML), and Extensible HyperText Markup Language (XHTML), and scripting languages such as Java Script and VB Script. In one embodiment, the server replaces the critical numeric or alphabetic characters with images. Since most scraping programs can only parse text information, these images can obscure the information carried therein. In a further embodiment, the server can also "slice up" a character into pieces and represent each piece with a separate image. As will be described below, the server can further dynamically generate these images to protect the information against any scraping programs with learning or optical character recognition (OCR) capabilities.

Figure 1:
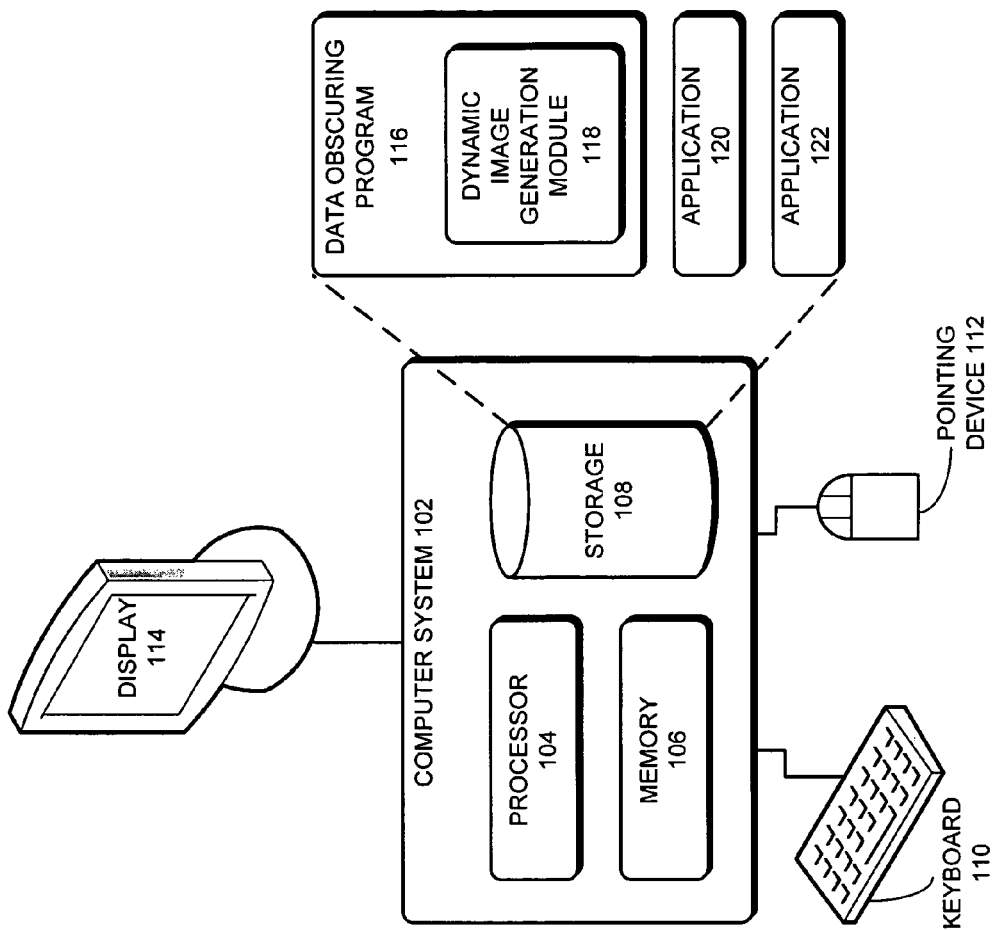
FIG. 1 presents a block diagram of a computer system that obscures critical data contained in a Web page in accordance with an embodiment of the present invention.

FIG. 1 presents a block diagram of a computer system that obscures critical data contained in a Web page in accordance with an embodiment of the present invention. A computer system 102 includes a processor 104, a memory 106, a storage 108, and may have coupled to it a display 114, a keyboard 110, and a pointing device 112, as well as other devices. Processor 104 can generally include any type of processor, including, but not limited to, a microprocessor, a mainframe computer, a digital signal processor, a personal organizer, a device controller, and a computational engine within an appliance, or have access to any of the foregoing via a network. Memory 106 can include any type of memory, including, but not limited to, dynamic random access memory (DRAM), static random access memory (SRAM), flash memory, read-only memory (ROM), and memory residing remotely and accessible via a network, volatile, non-volatile, or other memory capable of storing computer readable data.

Storage device 108 can include any type of non-volatile storage device that can be coupled to a computer system. This includes, but is not limited to, magnetic, optical, and magneto-optical storage devices, as well as storage devices based on flash memory and/or battery-backed up memory, network based storage or other storage media capable of storing computer readable data.

In one embodiment of the present invention, storage device 108 contains applications 120 and 122, and a data obscuring program 116. In other embodiments, the memory may store all or part of applications 120, 122, and a data-obscuring program 116. Data obscuring program 116 further includes a dynamic image generation module 118, which can dynamically generate images to replace a character in a set of critical data.

Obscuring Critical Data with Images

One embodiment of the present invention avoids communicating critical data in plain text in browser-interpretable files by embedding and displaying the data as images. For example, a server providing a Web-based financial service can first collect the financial data requested by a user, such as transaction amounts, dates, and account balances, and replace the key characters with individual images. Note that a character can be an alphabetic character, a numeric character, or a symbol.

The server then assembles a browser-interpretable file which can be, for example, an HTML file and which includes the images with the proper positioning and alignment, so that these images when displayed jointly can accurately present the critical data to the user. Note that the user's machine can parse the browser-interpretable file using a conventional Web browser, and the file can contain links to the image files stores on the server. In one embodiment, a character is represented by a static image file. In this way, the client can avoid multiple downloads by caching the image files.

Figure 2:
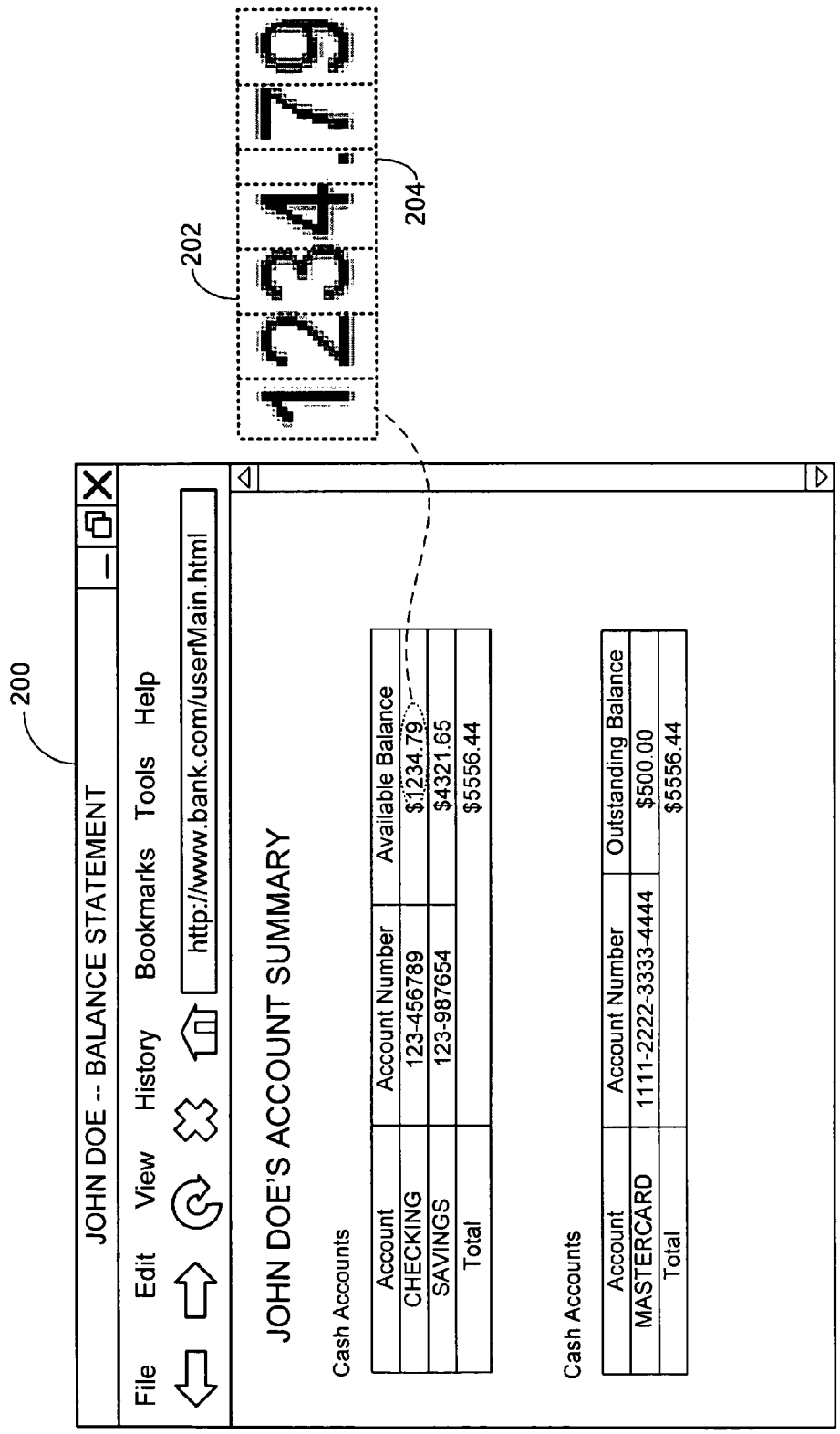
FIG. 2 illustrates a Web page that replaces characters with images in accordance with an embodiment of the present invention.

FIG. 2 illustrates a Web page that replaces characters with images in accordance with an embodiment of the present invention. In this example, a user's Web browser 200 displays the Web page based on the browser-interpretable file sent by the server. The displayed Web page shows a fictional bank account balance. The critical financial data in this page, such as the balance amounts and account numbers, are displayed as images. FIG. 2 also illustrates a magnified view of the balance amount "1234.79." Whereas the browser-interpretable file is an HTML file, the HTML code generally displays this amount in plain text:

<td>$1234.79</td>

In contrast, in embodiments of the present invention, each digit is displayed with a separate image. For example, the number "3" is displayed with an image 202, and the decimal point is displayed with an image 204. The corresponding HTML code can be:

<td>$<img src="1.png"><img src="2.png"><img src="3.png"><img src="4.png"><img src="dot.png"><img src="7.png"><img src="9.png"></td>

When the server replaces the character with static images, a scraping program can still derive an image-to-character mapping by applying OCR to each individual image. One way of preventing OCR-based scraping is to divide a character into multiple pieces, and to represent each piece with an image.

Figure 3:
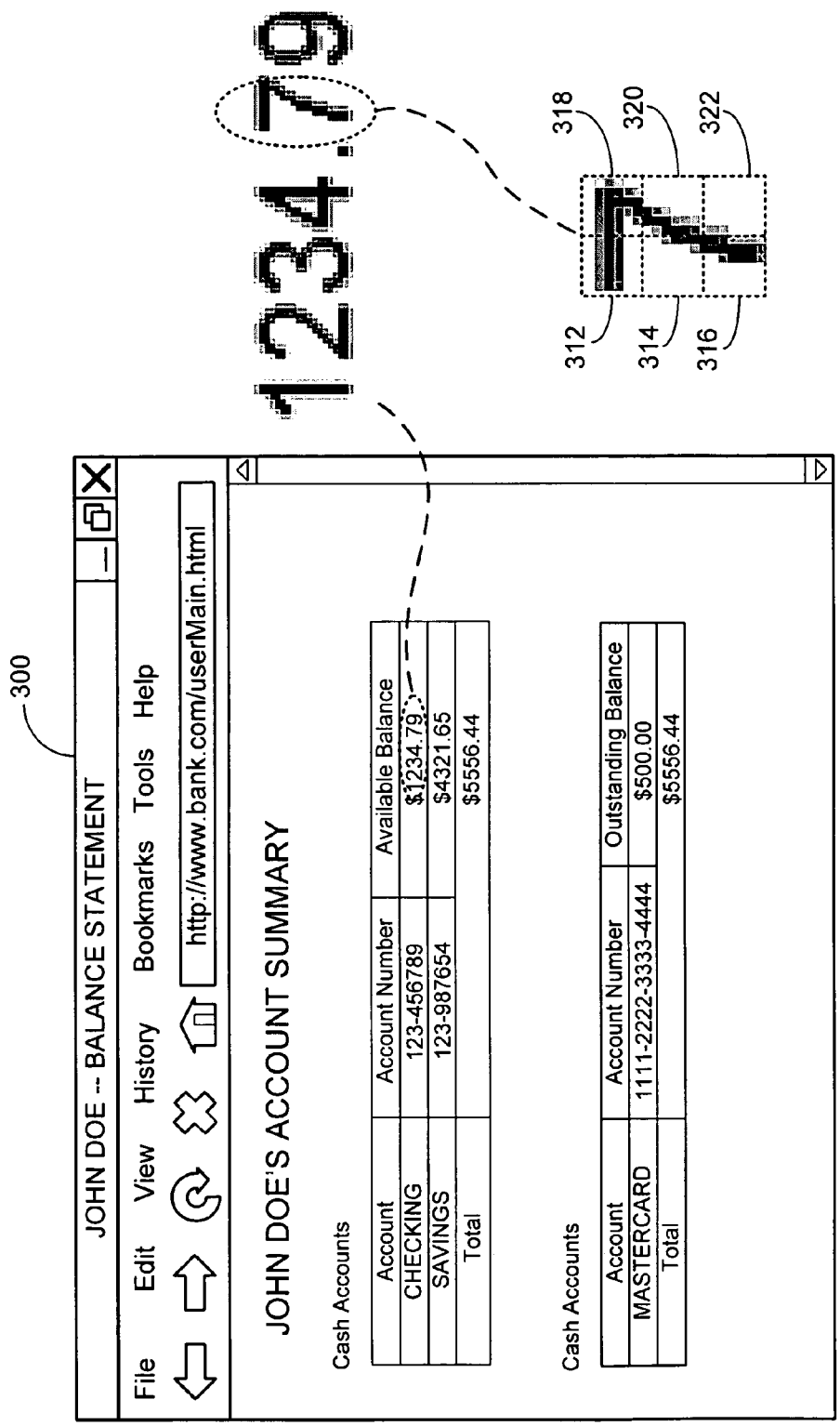
FIG. 3 illustrates a Web page that replaces one character with multiple images in accordance with an embodiment of the present invention.

FIG. 3 illustrates a Web page that replaces one character with multiple images in accordance with an embodiment of the present invention. A user browser 300 displays a Web page based on the browser-interpretable file received by the user's machine. The Web page displays critical financial information as images. However, a character, such as the number "7" as is shown in the magnified view, is divided into six portions and presented by six corresponding images 312-322. Since an image does not represent an entire character, a scraping program cannot establish an image-to-character mapping by performing OCR. Whereas the browser-interpretable file is an HTML file, a corresponding HTML code to display the number "7" can be:

```
<td><img                    src="7_upperleft.png"><img
   src="7_upperright.png"><br><img
   src="7_middleleft.png"><img
   src="7_middleright.png"><br><img
   src="7_lowerleft.png"><img
   src="7_upperright.png"></td>
```

In one embodiment, the server can further obscure the browser-interpretable file by dynamically generating the images and by assigning each image a different file name. For example, the server can generate one set of images to represent the characters in one session, and can expire these images when the user closes the session. In a further embodiment, the server can dynamically generate the images for each character which is replaced by images. That is, the same character can have different sets of representation images if the character is displayed at different locations. In this way, the server can minimize the risk of a scraper acquiring the image-to-character mapping. In addition, instead of generating actual image files, the server can dynamically, that is, non-deterministically, generate the universal resource identifiers (URI's) which are used to reference the images in the browser-interpretable file. In this way, the server can prevent an unauthorized scraper from acquiring a URI-to-image mapping. For example, an HTML code that displays the number "7" by using six dynamically referenced images can be:

```
<td><img                    src="2da09dj3.png"><img
   src="14fzs0dk.png"><br><img
   src="cv24iaf3.png"><img
   src="235bhgc0.png"><br><img
   src="2tfb054a.png"><img src="xcv30ik2.png"></td>
```

Secure Data Communication by Steganographical Encryption

Sometimes, a user may desire not only obscurity but also security of the critical data communicated over the network. In one embodiment of the present invention, the server employs steganographical encryption to conceal the critical data in another set of "cover-up" data. For example, the server can include an irrelevant image in the browser-interpretable file. The user's machine can extract concealed data from the image based on a secret key shared with the server. On the other hand, an unauthorized scraper only receives the cover image but has no way of knowing how to extract the concealed information.

Figure 4:
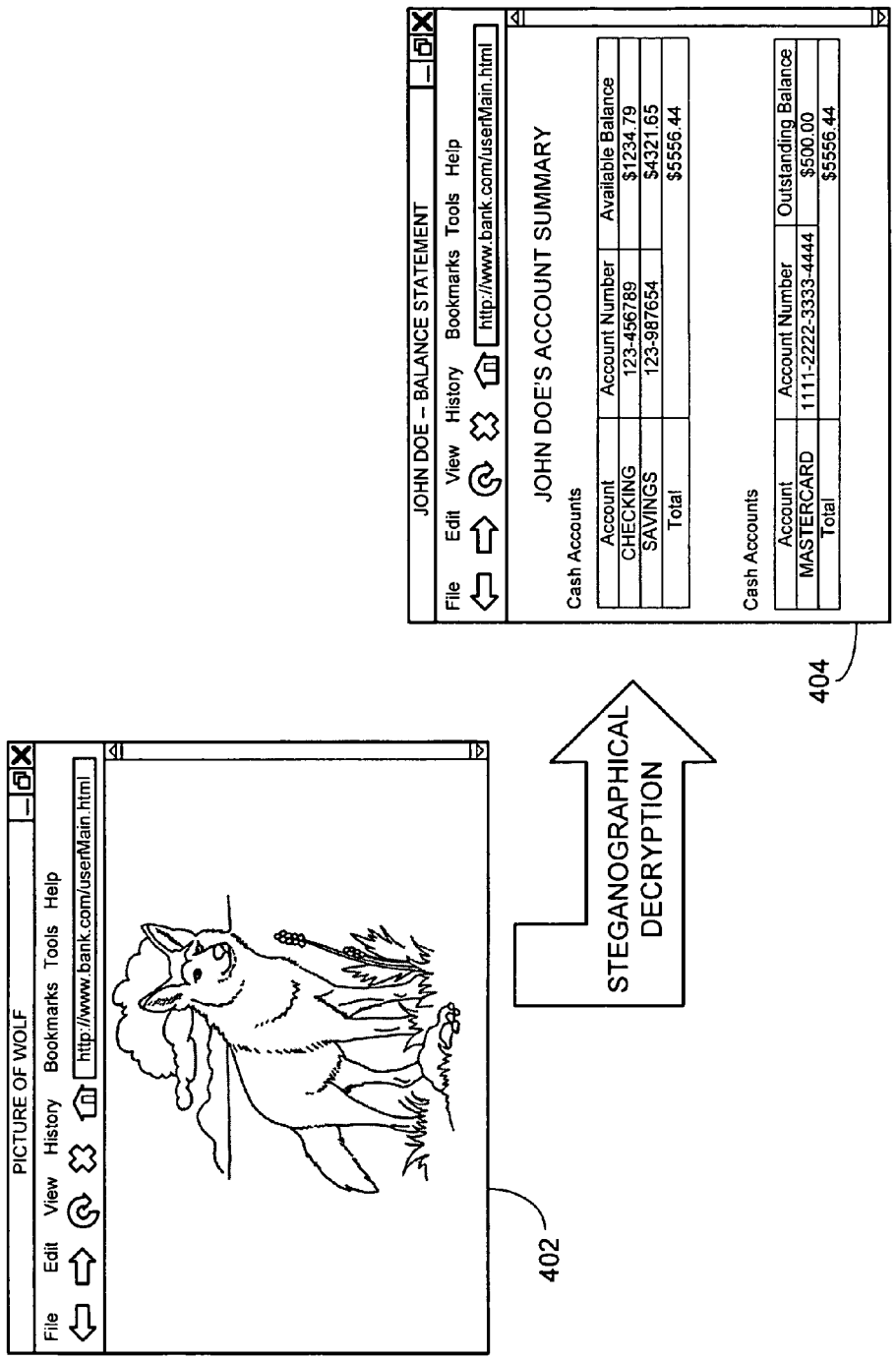
FIG. 4 illustrates a Web page that uses a cover image to steganographically encrypt critical data in accordance with an embodiment of the present invention.

FIG. 4 illustrates a Web page that uses a cover image to steganographically encrypt critical data in accordance with an embodiment of the present invention. In this example, an unauthorized scraper intercepts an browser-interpretable file sent from a server to a user. However, the image displayed by browser 402 does not reveal any critical data, because the scraper does not have the key to decrypt the image. The critical data can be concealed in the cover image in numerous ways. For instance, the critical data can be stored in the unused color bits for each pixel of the image.

On the other hand, when the intended user's Web browser 404 receives the browser-interpretable file, browser 404 first uses the decryption key to decrypt the information encoded in the cover image. Then, browser 404 displays the critical data to the user.

In further embodiments, the server can increase the security level by obscuring or encrypting the data concealed in the cover image. For example, the server can conceal an HTML file in the cover image. In this HTML file, the critical data are represented by images, as is described above in conjunction with FIGS. 2 and 3. Furthermore, before concealing the data in the cover image, the server can also encrypt the data using, for example, a public key of the user. In this way, only the user can extract and then decrypt the data using its private key. Other methods of obscuring or encrypting the data can also be used in conjunction with the steganographical encryption.

Exemplary Implementation

Figure 5:
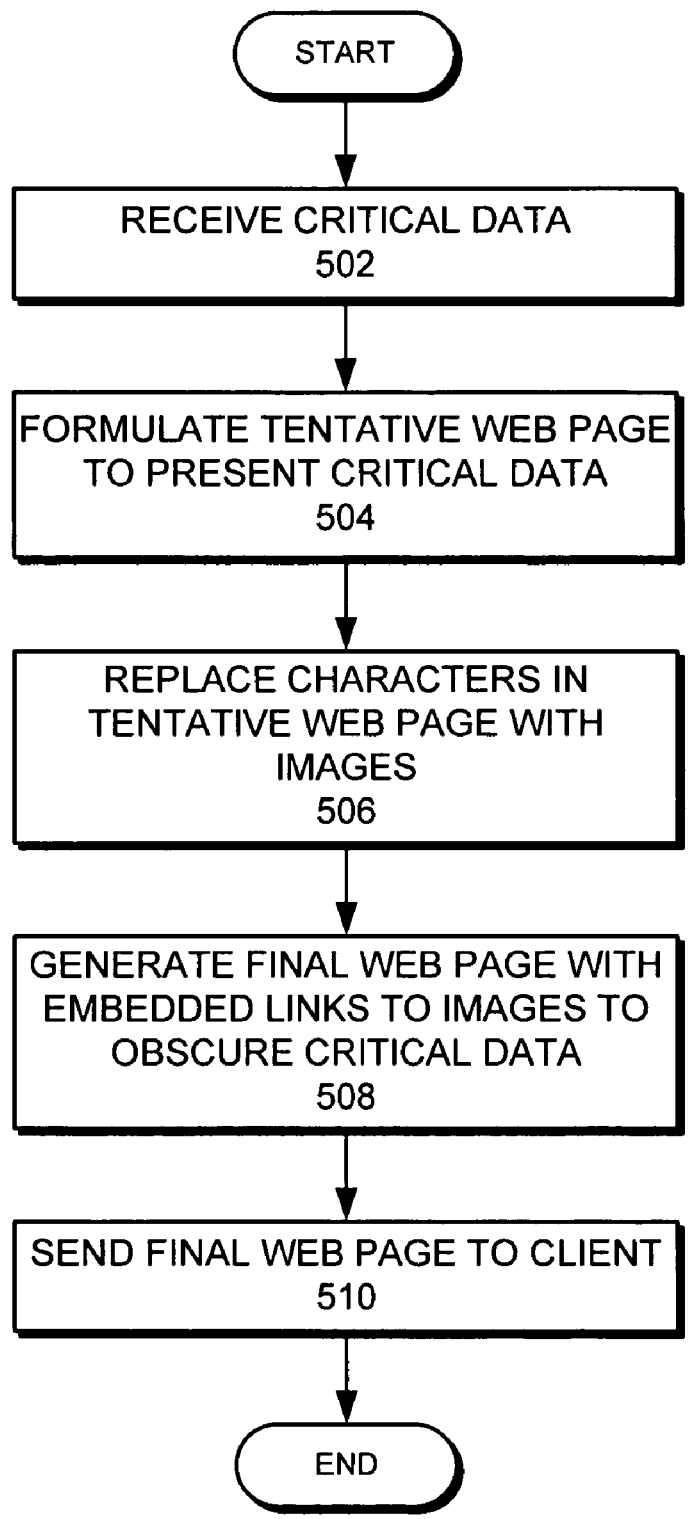
FIG. 5 presents a flow chart illustrating the process of obscuring critical Web-page data with images in accordance with an embodiment of the present invention.

FIG. 5 presents a flow chart illustrating the process of obscuring critical Web-page data with images in accordance with an embodiment of the present invention. During operation, the system at a server starts by receiving the critical data (step 502). The system then formulates a tentative Web page which presents the received critical data (step 504). Subsequently, the system replaces the characters in the tentative Web page with images (step 506).

Next, the system generates a final Web page with embedded links to the images and the proper arrangement of the images to ensure that the images can be displayed properly on a user's monitor (step 508). The server system then sends the final Web page to the client (step 510).

Figure 6:
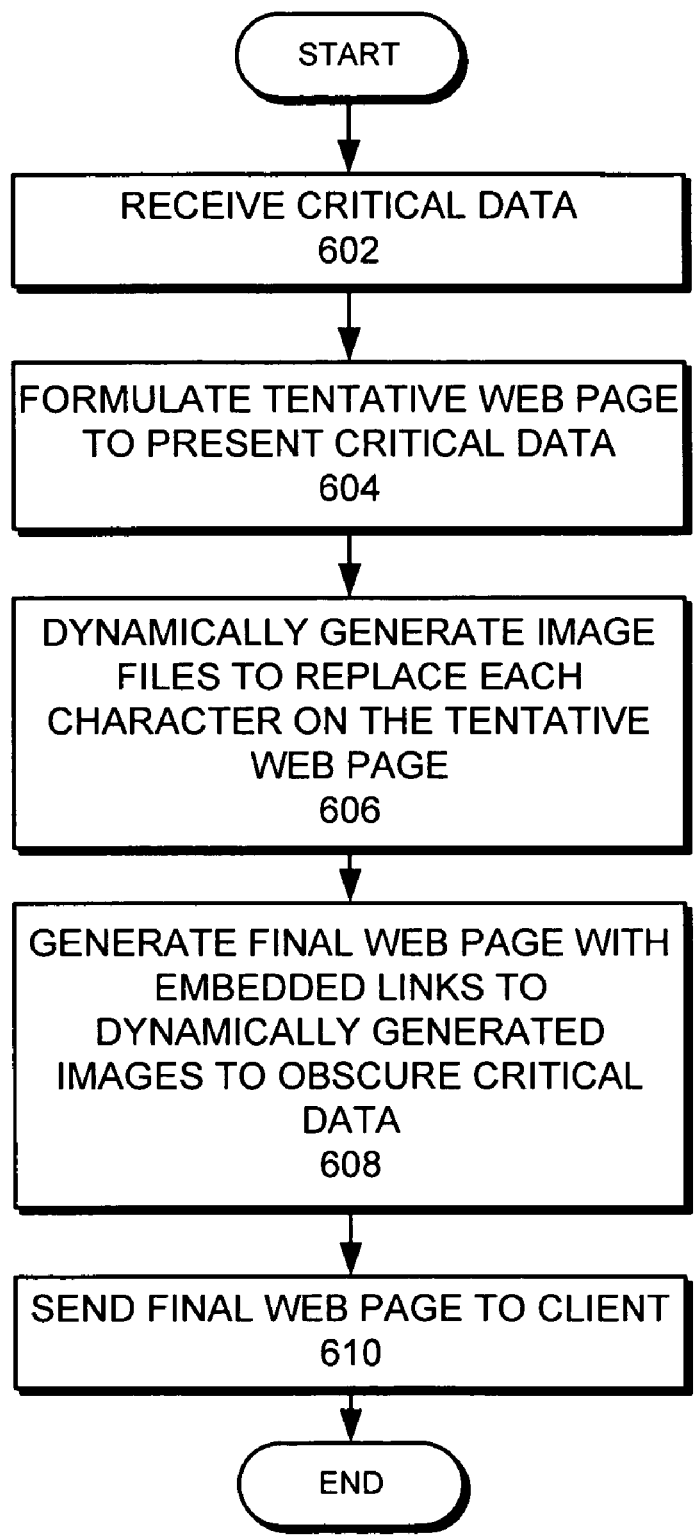
FIG. 6 presents a flow chart illustrating the process of dynamically generating images for obscuring critical Web-page data in accordance with an embodiment of the present invention.

FIG. 6 presents a flow chart illustrating the process of dynamically generating images for obscuring critical Web-page data in accordance with an embodiment of the present invention. During operation, the server system starts by receiving critical data (step 602) and formulating a tentative Web page which presents the received data (step 604). The system then dynamically generates the image files to replace characters on the tentative Web page (step 606).

Subsequently, the system generates a final Web page with embedded links to the dynamically generated images to obscure the critical data (step 608). The system then sends the final Web page to the client (step 610).

Figure 7:
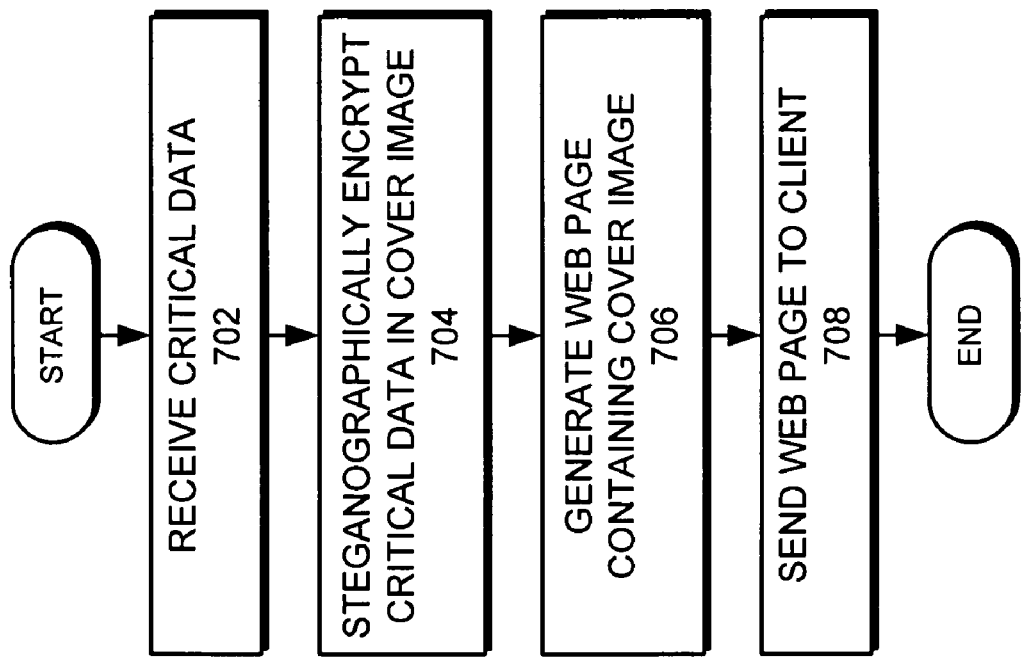
FIG. 7 presents a flow chart illustrating the process of steganographically encrypting critical data in accordance with one embodiment of the present invention.

FIG. 7 presents a flow chart illustrating the process of steganographically encrypting critical data in accordance with one embodiment of the present invention. During operation, the server system first receives the critical data (step 702). The system then steganographically encrypts the critical data in one or more cover images (step 704). Next, the system generates a Web page which contains the cover image (step 706). The system subsequently sends the Web page to the client (step 708).

Figure 8:
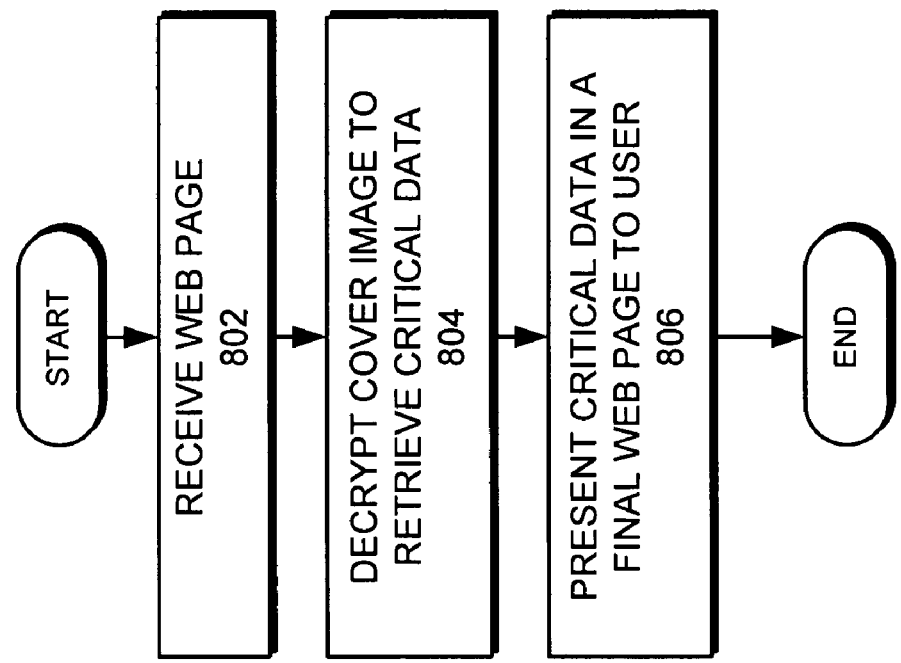
FIG. 8 presents a flow chart illustrating the process of decrypting steganographically-encrypted data in accordance with one embodiment of the present invention.

FIG. 8 presents a flow chart illustrating the process of decrypting steganographically-encrypted data in accordance with one embodiment of the present invention. During operation, the client system receives a Web page containing a cover image from the server (step 802). The system then decrypts the cover image to retrieve the critical data (step 804). Next, the system presents the critical data in a final Web page to a user (step 806).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for obscuring critical information communicated over a network, the method comprising:
   receiving a set of data;
   analyzing the set of data to determine a string of one or more characters which represents a subset of the set of data;
   generating multiple images, wherein the multiple images convey the subset of the set of data to a user when viewed by the user, and wherein at least one character in the string of one or more characters is split across two or more images in the multiple images;

substituting the multiple images for the subset in the set of data;

producing a file which includes the set of data with the multiple images, thereby avoiding representing the subset of the set of data in plain text and reducing the risk of scraping; and communicating the file to a client, thereby allowing the client to present the set of data that includes the multiple images to the user.

2. The method of claim 1, wherein the string of one or more characters can include an alphabetic character, a numeric character, or a symbol.

3. The method of claim 1, characters into a number of portions and replacing each portion with an image;

wherein the string of one or more characters can include an alphabetic character, a numeric character, or a symbol.

4. The method of claim 1, further comprising:

dynamically generating the images used for each session, thereby preventing an unauthorized scraper from acquiring a mapping between multiple images and a character through optical character recognition (OCR).

5. The method of claim 1, further comprising:

dynamically generating universal resource identifiers (URI's) used to reference the images, thereby preventing an unauthorized scraper from acquiring a mapping between an image and the URI used to reference the image.

6. The method of claim 1, further comprising:

dynamically generating the images for each character represented by image, thereby preventing an unauthorized scraper from acquiring a mapping between multiple images and a character through OCR.

7. The method of claim 1, further comprising:

steganographically concealing the file within one or more cover images, thereby further reducing the risk of scraping; and wherein communicating the file to the client involves communicating the cover images to the client, thereby allowing the client to extract the concealed file.

8. The method of claim 7, further comprising encrypting the file prior to steganographically concealing the file.

9. A computer system for obscuring critical information communicated over a network, the computer system comprising:

a processor;

a memory;

a receiving mechanism configured to receive a set of data;

an analysis mechanism configured to analyze the set of data to determine a string of one or more characters which represents a subset of the set of data;

an image generation mechanism configured to generate multiple images, wherein the multiple images convey the subset of the set of data to a user when viewed by the user, and wherein at least one character in the string of one or more characters is split across two or more images in the multiple images;

a substitution mechanism configured to substitute the multiple images for the subset in the set of data;

a data obscuring mechanism configured to produce a file which includes the set of data with the multiple images, thereby avoiding representing the subset of the set of data in plain text and reducing the risk of scraping; and a communication mechanism configured to communicate the file to a client, thereby allowing the client to present the set of data that includes the multiple images to the user.

10. The computer system of claim 9, wherein the string of one or more characters can include an alphabetic character, a numeric character, or a symbol.

11. The computer system of claim 9, wherein the string of one or more characters can include an alphabetic character, a numeric character, or a symbol.

12. The computer system of claim 9, further comprising:

an image generation mechanism configured to dynamically generate the images used for each session, thereby preventing an unauthorized scraper from acquiring a mapping between multiple images and a character through OCR.

13. The computer system of claim 9, further comprising:

a URI generation mechanism configured to dynamically generate the URI's used to reference the images, thereby preventing an unauthorized scraper from acquiring a mapping between an image and the URI used to reference the image.

14. The computer system of claim 9, further comprising:

an image generation mechanism configured to dynamically generate the images for each character represented by image, thereby preventing an unauthorized scraper from acquiring a mapping between multiple images and a character through OCR.

15. The computer system of claim 9, further comprising:

an encryption mechanism configured to steganographically conceal the file within one or more cover images, thereby further reducing the risk of scraping; and wherein while communicating the file to the client involves communicating the cover images to the client, thereby allowing the client to extract the concealed file.

16. The computer system of claim 15, wherein the encryption mechanism is configured to encrypt the file prior to steganographically concealing the file.

17. A method for obscuring critical information communicated over a network, the method comprising:

receiving a set of data;

analyzing the set of data to determine a string of one or more characters which represents a subset of the set of data;

generating multiple images, wherein the multiple images convey the subset of the set of data to a user when viewed by the user, wherein said generating involves dynamically generating the multiple images for each session, thereby preventing an unauthorized scraper from acquiring a mapping between the multiple images and a character through optical character recognition (OCR);

substituting the multiple images for the subset in the set of data;

producing a file which includes the set of data with the multiple images, thereby avoiding representing the subset of the set of data in plain text and reducing the risk of scraping; and communicating the file to a client, thereby allowing the client to present the set of data that includes the multiple images to the user.

18. A computer system for obscuring critical information communicated over a network, the computer system comprising:

a processor; and a memory storing instructions that, when executed by the processor, cause the computer system to perform a method, the method comprising:

receiving a set of data;

analyzing the set of data to determine a string of one or more characters which represents a subset of the set of data;

generating multiple images, wherein the multiple images convey the subset of the set of data to a user when viewed by the user, wherein said generating involves dynamically generating the multiple images for each session, thereby preventing an unauthorized scraper from acquiring a mapping between the multiple images and a character through optical character recognition (OCR);

substituting the multiple images for the subset in the set of data;

producing a file which includes the set of data with the multiple images, thereby avoiding representing the subset of the set of data in plain text and reducing the risk of scraping; and communicating the file to a client, thereby allowing the client to present the set of data that includes the multiple images to the user.

* * * * *

UNITED STATES PATENT AND TRADEMARK OFFICE
CERTIFICATE OF CORRECTION

| | |
|---|---|
| PATENT NO. | : 8,041,127 B2 |
| APPLICATION NO. | : 11/607582 |
| DATED | : October 18, 2011 |
| INVENTOR(S) | : James E. Whitelaw et al. |

Page 1 of 1

It is certified that error appears in the above-identified patent and that said Letters Patent is hereby corrected as shown below:

In claim 3 (at column 7, line 16-17), please remove the lines "characters into a number of portions and replacing each portion with an image" so that the claim reads:
--The method of claim 1, wherein the string of one or more characters can include an alphabetic character, a numeric character, or a symbol.--

Signed and Sealed this
Tenth Day of January, 2012

David J. Kappos
*Director of the United States Patent and Trademark Office*